(12) United States Patent
Park et al.

(10) Patent No.: US 10,138,984 B2
(45) Date of Patent: Nov. 27, 2018

(54) PLANETARY GEAR TRAIN OF VEHICLE AUTOMATIC TRANSMISSION

(71) Applicant: HYUNDAI MOTOR COMPANY, Seoul (KR)

(72) Inventors: Jong Sool Park, Hwaseong-si (KR); Dong Hwan Hwang, Seoul (KR); SeokJin Kim, Hwaseong-si (KR); Kyeong Hun Lee, Seoul (KR); Jong Soo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 58 days.

(21) Appl. No.: 15/239,289

(22) Filed: Aug. 17, 2016

(65) Prior Publication Data

US 2017/0268606 A1 Sep. 21, 2017

(30) Foreign Application Priority Data

Mar. 18, 2016 (KR) .......................... 10-2016-0032986

(51) Int. Cl.
*F16H 3/66* (2006.01)

(52) U.S. Cl.
CPC ....... *F16H 3/666* (2013.01); *F16H 2200/006* (2013.01); *F16H 2200/2012* (2013.01); *F16H 2200/2043* (2013.01)

(58) Field of Classification Search
CPC ................. F16H 2200/2043; F16H 2200/2012
See application file for complete search history.

(56) References Cited

U.S. PATENT DOCUMENTS

| 7,892,137 | B2* | 2/2011 | Kamm ..................... F16H 3/666 475/277 |
| 8,016,712 | B2* | 9/2011 | Phillips ..................... F16H 3/66 475/282 |
| 8,465,394 | B2* | 6/2013 | Cuppers ................ B60W 10/06 477/109 |
| 9,382,977 | B2* | 7/2016 | Beck ........................ F16H 3/666 |

FOREIGN PATENT DOCUMENTS

| JP | 2009-293762 A | 12/2009 |
| JP | 2009-0299763 A | 12/2009 |
| JP | 2009299763 A | * 12/2009 |
| KR | 10-2010-0018699 A | 2/2010 |
| KR | 10-2015-0065094 A | 6/2015 |

* cited by examiner

*Primary Examiner* — Sherry L Estremsky
(74) *Attorney, Agent, or Firm* — McDermott Will & Emery LLP

(57) ABSTRACT

A planetary gear train of an automatic transmission for a vehicle includes an input shaft, an output shaft, a first planetary gear set including first, second and third rotation elements, a second planetary gear set including fourth, fifth and sixth rotation elements, a third planetary gear set including seventh, eighth and ninth rotation elements, a fourth planetary gear set including tenth, eleventh and twelfth rotational elements, a first shaft, a second shaft, a third shaft, a fourth shaft, a fifth shaft connecting the sixth rotational element to the seventh rotational element and selectively connected to the input shaft or the third shaft, a sixth shaft connecting the eighth rotational element to the twelfth rotational element, a seventh shaft connected to the ninth rotational element, and an eighth shaft connected to the eleventh rotational element, selectively connected to the fourth shaft and directly connected to the output shaft.

8 Claims, 2 Drawing Sheets

FIG. 2

| Speed stages | Control element | | | | | Gear ratio | Step ratio | Note |
|---|---|---|---|---|---|---|---|---|
| | B1 | B2 | C1 | C2 | C3 | | | |
| D1 | ● | ● | | ● | | 5.439 | - | Gear ratio span : 8.472  R/D1 : -0.709 |
| D2 | ● | ● | | | ● | 3.493 | 1.557 | |
| D3 | | ● | ● | | ● | 2.252 | 1.551 | |
| D4 | | ● | ● | | ● | 1.765 | 1.276 | |
| D5 | | ● | ● | ● | | 1.338 | 1.319 | |
| D6 | | | ● | ● | ● | 1.000 | 1.338 | |
| D7 | ● | | ● | ● | | 0.822 | 1.217 | |
| D8 | ● | | ● | | ● | 0.642 | 1.280 | |
| REV | ● | ● | ● | | | -3.854 | - | |

PLANETARY GEAR TRAIN OF VEHICLE AUTOMATIC TRANSMISSION

CROSS-REFERENCE TO RELATED APPLICATION

This application claims the benefit of priority to Korean Patent Application No. 10-2016-0032986, filed with the Korean Intellectual Property Office on Mar. 18, 2016, the entire contents of which are incorporated herein by reference.

TECHNICAL FIELD

The present disclosure relates to an automatic transmission for a vehicle. More particularly, the present disclosure relates to a planetary gear train of a vehicle automatic transmission that improves power delivery performance and fuel economy by achieving eight forward speed stages with a minimum number of constituent elements and improves silent driving of the vehicle by using an operation point positioned at a low engine speed.

BACKGROUND

Generally, an automatic transmission achieving more speed stages has been developed to enhance fuel economy and optimize drivability. Recently, an increase of oil prices has triggered competition in enhancing fuel consumption of a vehicle.

Therefore, much research for reducing weight and enhancing fuel economy through engine downsizing and for securing drivability and fuel economy through multiple speed stages of automatic transmissions has been undertaken.

However, in the automatic transmission, as the number of speed stages increases, the number of internal components (particularly, planetary gear sets) increases, and as a result, a length of the transmission increases. Therefore, mountability, cost, weight, transmission efficiency, and the like may deteriorate.

Accordingly, development of a planetary gear train which may achieve maximum efficiency with a small number of components may be important in order to increase a fuel economy enhancement effect through the multiple-speeds.

In this aspect, in recent years, 8-speed automatic transmissions have been implemented and the research and development of a planetary gear train capable of implementing more speed stages has also been actively conducted.

However, a conventional 8-speed automatic transmission typically includes three to four planetary gear sets and five to six control elements (frictional elements). In this embodiment, since the length of the automatic transmission may be large, mountability may be deteriorated.

One planetary gear set is often disposed above another planetary gear set, but structures of automatic transmissions to which parallel planetary gear sets are applied are limited.

In another method, dog clutches instead of control elements of a wet-type are used. However, in such an arrangement, shift feel can deteriorate.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a planetary gear train of an automatic transmission for a vehicle having advantages of improving power delivery performance and fuel economy by achieving at least eight forward speed stages and one reverse speed stage.

Another embodiment of the present disclosure provides a planetary gear train of an automatic transmission for a vehicle having further advantages of improving silent driving of the vehicle by using operation point positioned at a low rotational speed region of an engine.

A planetary gear train of an automatic transmission for a vehicle according to an exemplary embodiment of the present disclosure may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft connecting the first rotational element to the tenth rotational element; a second shaft connected to the second rotational element and directly connected to the input shaft; a third shaft connecting the third rotational element to the fourth rotational element; a fourth shaft connected to the fifth rotational element; a fifth shaft connecting the sixth rotational element to the seventh rotational element and selectively connected to the input shaft or the third shaft; a sixth shaft connecting the eighth rotational element to the twelfth rotational element; a seventh shaft connected to the ninth rotational element; and an eighth shaft connected to the eleventh rotational element, selectively connected to the fourth shaft, and directly connected to the output shaft.

The first shaft and the seventh shaft may be selectively connected to a transmission housing.

The first, second, third, and fourth planetary gear sets may be disposed in a sequence of the third, second, first, and fourth planetary gear sets from an engine side.

The first, second, and third rotation elements of the first planetary gear set may be a first sun gear, a first planet carrier, and a first ring gear, the fourth, fifth, and sixth rotation elements of the second planetary gear set may be a second sun gear, a second planet carrier, and a second ring gear, the seventh, eighth, and ninth rotation elements of the third planetary gear set may be a third sun gear, a third planet carrier, and a third ring gear, and the tenth, eleventh, and twelfth rotation elements of the fourth planetary gear set may be a fourth sun gear, a fourth planet carrier, and a fourth ring gear, respectively.

The fourth sun gear externally engaged with a fourth pinion gear rotatably supported by the fourth planet carrier may be divided into two pieces apart from each other which form a space therebetween, and a connecting member penetrating through the fourth pinion gear and connecting both side surfaces of the fourth planet carrier may be connected to the eighth shaft through the space and may be directly connected to the output shaft.

The planetary gear train may further include: a first clutch selectively connecting the fourth shaft to the eighth shaft; a second clutch selectively connecting the input shaft to the fifth shaft; a third clutch selectively connecting the third shaft to the fifth shaft; a first brake selectively connecting the seventh shaft to the transmission housing; and a second brake selectively connecting the first shaft to the transmission housing.

A planetary gear train of an automatic transmission for a vehicle according to another exemplary embodiment of the present disclosure may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; and a fourth planetary gear set including tenth, eleventh, and twelfth rotation elements, wherein the input shaft is directly connected to the second rotational element, the output shaft is directly connected to the eleventh rotational element, the first rotational element is directly connected to the tenth rotational element, the third rotational element is directly connected to the fourth rotational element, the sixth rotational element is directly connected to the seventh rotational element and is selectively connected to the input shaft or the fourth rotational element, the eighth rotational element is directly connected to the twelfth rotational element, and the eleventh rotational element is selectively connected to the fifth rotational element.

The ninth rotational element and the tenth rotational element may be selectively connected to a transmission housing, respectively.

The first, second, third, and fourth planetary gear sets may be disposed in a sequence of the third, second, first, and fourth planetary gear sets from an engine side.

The first, second, and third rotation elements of the first planetary gear set may be a first sun gear, a first planet carrier, and a first ring gear, the fourth, fifth, and sixth rotation elements of the second planetary gear set may be a second sun gear, a second planet carrier, and a second ring gear, the seventh, eighth, and ninth rotation elements of the third planetary gear set may be a third sun gear, a third planet carrier, and a third ring gear, and the tenth, eleventh, and twelfth rotation elements of the fourth planetary gear set may be a fourth sun gear, a fourth planet carrier, and a fourth ring gear, respectively.

The fourth sun gear externally engaged with a fourth pinion gear rotatably supported by the fourth planet carrier may be divided into two pieces apart from each other which form a space therebetween, and a connecting member penetrating through the fourth pinion gear and connecting both side surfaces of the fourth planet carrier may be connected to the eighth shaft through the space and may be directly connected to the output shaft.

The planetary gear train may further include: a first clutch selectively connecting the fifth rotational element to the eleventh rotational element; a second clutch selectively connecting the input shaft to the seventh rotational element; a third clutch selectively connecting the fourth rotational element to the seventh rotational element; a first brake selectively connecting the ninth rotational element to the transmission housing; and a second brake selectively connecting the tenth rotational element to the transmission housing.

The planetary gear train according to the exemplary embodiment of the present disclosure may achieve eight forward speed stages and one reverse speed stage by combining four planetary gear sets being simple planetary gear sets with five control elements.

In addition, the planetary gear train according to the exemplary embodiment of the present disclosure may achieve speed stages suitable to a rotational speed of the engine due to multiple-speed stages of the automatic transmission. Particularly, silent driving of the vehicle may be improved by using operation point positioned at a low rotational speed region of an engine.

In addition, the planetary gear train according to the exemplary embodiment of the present disclosure may maximize driving efficiency of the engine and may improve power delivery performance and fuel consumption.

Other effects obtainable or predictable from an exemplary embodiment of the present disclosure will be explicitly or implicitly described in a DETAILED DESCRIPTION section. That is, various effects predictable from an exemplary embodiment of the present disclosure will be described in the DETAILED DESCRIPTION section.

BRIEF DESCRIPTION OF THE DRAWINGS

FIG. 2 is an operation chart of control elements at each speed stage in a planetary gear train according to an exemplary embodiment of the present disclosure.

DETAILED DESCRIPTION

Figure 1:
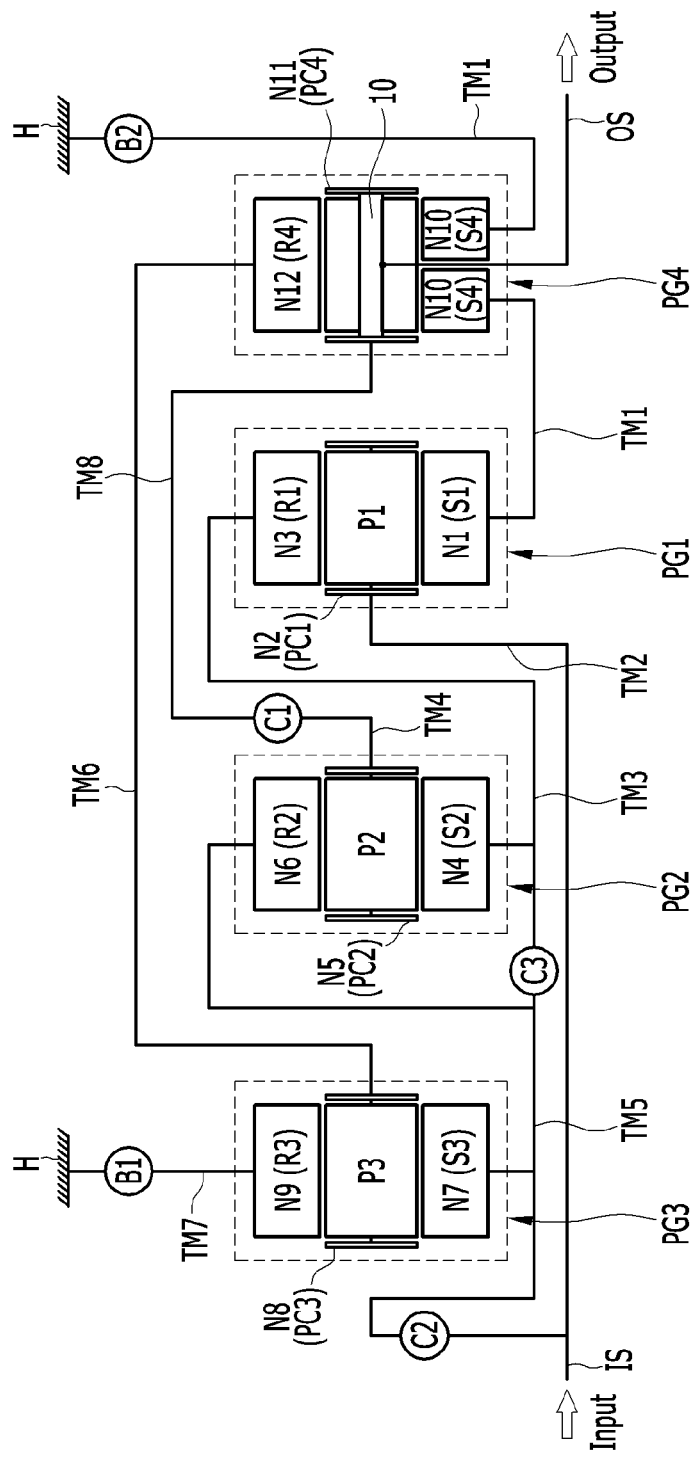
FIG. 1 is a schematic diagram of a planetary gear train according to an exemplary embodiment of the present disclosure.

Hereinafter, an exemplary embodiment of the present disclosure will be described in detail with reference to the accompanying drawings.

However, parts which are not related to the description may be omitted for clearly describing the exemplary embodiments of the present disclosure and like reference numerals may refer to like or similar elements throughout the specification.

In the following description, dividing names of components into first, second, and the like is to divide the names because the names of the components are the same as each other, and an order thereof is not particularly limited.

FIG. 1 is a schematic diagram of a planetary gear train according to an exemplary embodiment of the present disclosure.

Referring to FIG. 1, a planetary gear train according to first exemplary embodiment of the present disclosure may include first, second, third, and fourth planetary gear sets PG1, PG2, PG3, and PG4, respectively, disposed on the same axis, an input shaft IS, an output shaft OS, eight shafts TM1 to TM8 connected to at least one of rotation elements of the first, second, third, and fourth planetary gear sets PG1, PG2, PG3, and PG4, three clutches C1 to C3 and two brakes B1 and B2 that are control elements, and a transmission housing H.

Torque input from the input shaft IS may be changed by cooperation of the first, second, third, and fourth planetary gear sets PG1, PG2, PG3, and PG4, and the changed torque may be output through the output shaft OS.

Herein, the planetary gear sets are disposed in a sequence of the third, second, first, and fourth planetary gear sets PG3, PG2, PG1, and PG4 from an engine side.

The input shaft IS may be an input member and torque from a crankshaft of the engine may be torque-converted through a torque converter to be input into the input shaft IS.

The output shaft OS may be an output member, disposed in parallel with the input shaft IS, and transmit driving torque to a driving wheel through a differential apparatus.

The first planetary gear set PG1 may be a single pinion planetary gear set and include a first sun gear S1, a first planet carrier PC1 rotatably supporting a first pinion P1 externally meshed with the first sun gear S1, and a first ring gear R1 internally meshed with the first pinion P1 respectively as first, second, and third rotation elements N1, N2 and N3.

The second planetary gear set PG2 may be a single pinion planetary gear set and include a second sun gear S2, a second planet carrier PC2 rotatably supporting a second pinion P2 externally meshed with the second sun gear S2, and a second ring gear R2 internally meshed with the second pinion P2 respectively as fourth, fifth, and sixth rotation elements N4, N5 and N6.

The third planetary gear set PG3 may be a single pinion planetary gear set and include a third sun gear S3, a third planet carrier PC3 rotatably supporting a third pinion P3 externally meshed with the third sun gear S3, and a third ring gear R3 internally meshed with the third pinion P3 respectively as seventh, eighth, and ninth rotation elements N7, N8 and N9.

The fourth planetary gear set PG4 may be a single pinion planetary gear set and include a fourth sun gear S4, a fourth planet carrier PC4 rotatably supporting a fourth pinion P4 externally meshed with the fourth sun gear S4, and a fourth ring gear R4 internally meshed with the fourth pinion P4 respectively as tenth, eleventh, and twelfth rotation elements N10, N11, and N12.

Herein, the fourth sun gear S4 externally engaged with the fourth pinion gear P4 rotatably supported by the fourth planet carrier PC4 may be divided into two pieces apart from each other and forming a space therebetween.

In addition, a connecting member 10 penetrating through the fourth pinion gear P4 and connecting both side surfaces of the fourth planet carrier may be connected to the eighth shaft TM8 through the space and may be directly connected to the output shaft OS.

At this time, since the two pieces of the fourth sun gear S4 may be engaged to the fourth pinion gear P4 with the same gear ratio, the two pieces of the fourth sun gear S4 may rotate with the same rotation speed.

The first rotational element N1 may be directly connected to the tenth rotational element N10, the third rotational element N3 may be directly connected to the fourth rotational element N4, the sixth rotational element N6 may be directly connected to the seventh rotational element N7, and the eighth rotational element N8 may be directly connected to the twelfth rotational element N12 such that the first, second, third, and fourth planetary gear sets PG1, PG2, PG3, and PG4 include eight rotation shafts TM1 to TM8.

The eight rotation shafts TM1 to TM8 will be described in detail.

The eight shafts TM1 to TM8 may directly connect a plurality of rotation elements among the rotation elements of the planetary gear sets PG1, PG2, PG3 and PG4, may be rotation members that may be directly connected to any one rotation element of the planetary gear sets PG1, PG2, PG3 and PG4 and may rotate with the any one rotation element to transmit torque, or may be fixed members that directly connect any one rotation element of the planetary gear sets PG1, PG2, PG3 and PG4 to the transmission housing H to fix the any one rotation element.

The first shaft TM1 may directly connect the first rotational element N1 (first sun gear S1) to the tenth rotational element N10 (fourth sun gear S4) and may be selectively connected to the transmission housing H so as to be operated as a selective fixed element.

The second shaft TM2 may be directly connected to the second rotational element N2 (first planet carrier PC1) and may be directly connected to the input shaft IS so as to be always operated as an input element.

The third shaft TM3 directly may connect the third rotational element N3 (first ring gear R1) to the fourth rotational element N4 (second sun gear S2).

The fourth shaft TM4 may be directly connected to the fifth rotational element N5 (second planet carrier PC2).

The fifth shaft TM5 may directly connect the sixth rotational element N6 (second ring gear R2) to the seventh rotational element N7 (third sun gear S3), may be selectively connected to the third shaft TM3, and may be selectively connected to the input shaft IS so as to be operated as a selective input element.

The sixth shaft TM6 directly may connect the eighth rotational element N8 (third planet carrier PC3) to the twelfth rotational element N12 (fourth ring gear R4).

The seventh shaft TM7 may be connected to the ninth rotational element N9 (third ring gear R3) and may be selectively connected to the transmission housing H.

The eighth shaft TM8 may be connected to the eleventh rotational element N11 (fourth planet carrier PC4), may be selectively connected to the fourth shaft TM4, and maybe directly connected to the output shaft OS so as to be always operated as an output element.

In addition, three clutches C1, C2, and C3 may be disposed at portions at which any two shafts among the eight shafts TM1 to TM8 including the input shaft IS and the output shaft OS are selectively connected to each other.

In addition, two brakes B1 and B2 may be disposed at portions at which any one shaft among the eight shafts TM1 to TM8 is selectively connected to the transmission housing H.

Arrangements of the three clutches C1 to C3 and the two brakes B1 and B2 will be described in detail.

The first clutch C1 may be disposed between the fourth shaft TM4 and the eighth shaft TM8 and selectively connect the fourth shaft TM4 to the eighth shaft TM8.

The second clutch C2 may be disposed between the input shaft IS and the fifth shaft TM5 and selectively connect the input shaft IS to the fifth shaft TM5.

The third clutch C3 may be disposed between the third shaft TM3 and the fifth shaft TM5 and selectively connect the third shaft TM3 to the fifth shaft TM5.

The first brake B1 may be disposed between the seventh shaft TM7 and the transmission housing H and selectively connect the seventh shaft TM7 to the transmission housing H.

The second brake B2 may be disposed between the first shaft TM1 and the transmission housing H and selectively connect the first shaft TM1 to the transmission housing H.

The control elements including the first, second and third clutches, C1, C2 and C3, respectively, and the first and second brakes B1 and B2 may be multi-plates friction elements of wet type that are operated by hydraulic pressure.

FIG. 2 is an operation chart of control elements at each speed stage in a planetary gear train according to an exemplary embodiment of the present disclosure.

As shown in FIG. 2, three control elements among the first, second and third clutches C1, C2 and C3, respectively, and the first and second brakes B1 and B2 that may be control elements may be operated at each speed stage in the planetary gear train according to an exemplary embodiment of the present disclosure.

The first and second brakes B1 and B2 and the second clutch C2 may be simultaneously operated at a first forward speed stage D1.

In a state that the input shaft IS is connected to the fifth shaft TM5 by operation of the second clutch C2, torque of the input shaft IS may be input to the second shaft TM2 and the fifth shaft TM5. In addition, the seventh shaft TM7 and the first shaft TM1 may be operated as the fixed elements by operation of the first and second brakes B1 and B2. Therefore, the torque of the input shaft IS may be shifted into the first forward speed stage, and the first forward speed stage may be output through the output shaft OS connected to the eighth shaft TM8.

The first and second brakes B1 and B2 and the third clutch C3 may be simultaneously operated at a second forward speed stage D2.

In a state that the third shaft TM3 is connected to the fifth shaft TM5 by operation of the third clutch C3, the torque of the input shaft IS may be input to the second shaft TM2. In addition, the seventh shaft TM7 and the first shaft TM1 may be operated as the fixed elements by operation of the first and second brakes B1 and B2. Therefore, the torque of the input shaft IS may be shifted into the second forward speed stage, and the second forward speed stage may be output through the output shaft OS connected to the eighth shaft TM8.

The second brake B2 and the second and third clutches C2 and C3 may be simultaneously operated at a third forward speed stage D3.

In a state that the input shaft IS is connected to the fifth shaft TM5 by operation of the second clutch C2 and the third shaft TM3 is connected to the fifth shaft TM5 by operation of the third clutch C3, the torque of the input shaft IS may be input to the second shaft TM2 and the fifth shaft TM5. In addition, the first shaft TM1 may be operated as the fixed element by operation of the second brake B2. Therefore, the torque of the input shaft IS may be shifted into the third forward speed stage, and the third forward speed stage may be output through the output shaft OS connected to the eighth shaft TM8.

The second brake B2 and the first and third clutches C1 and C3 may be simultaneously operated at a fourth forward speed stage D4.

In a state that the fourth shaft TM4 is connected to the eighth shaft TM8 by operation of the first clutch C1 and the third shaft TM3 is connected to the fifth shaft TM5 by operation of the third clutch C3, the torque of the input shaft IS may be input to the second shaft TM2. In addition, the first shaft TM1 may be operated as the fixed element by operation of the second brake B2. Therefore, the torque of the input shaft IS may be shifted into the fourth forward speed stage, and the fourth forward speed stage may be output through the output shaft OS connected to the eighth shaft TM8.

The second brake B2 and the first and second clutches C1 and C2 may be simultaneously operated at a fifth forward speed stage D5.

In a state that the fourth shaft TM4 is connected to the eighth shaft TM8 by operation of the first clutch C1 and the input shaft IS is connected to the fifth shaft TM5 by operation of the second clutch C2, the torque of the input shaft IS may be input the second shaft TM2 and the fifth shaft TM5. In addition, the first shaft TM1 may be operated as the fixed element by operation of the second brake B2. Therefore, the torque of the input shaft IS may be shifted into the fifth forward speed stage, and the fifth forward speed stage may be output through the output shaft OS connected to the eighth shaft TM8.

The first, second, and third clutches C1, C2, and C3 may be simultaneously operated at a sixth forward speed stage D6.

The fourth shaft TM4 may be connected to the eighth shaft TM8 by operation of the first clutch C1, the input shaft IS may be connected to the fifth shaft TM5 by operation of the second clutch C2, and the third shaft TM3 may be connected to the fifth shaft TM5 by operation of the third clutch C3 such that all the planetary gear sets become lock-up states. At this state, the torque of the input shaft IS may be input to the second shaft TM2 and the fifth shaft TM5 and the sixth forward speed stage may be output through the output shaft OS connected to the eighth shaft TM8. At the sixth forward speed stage, the same rotation speed as the input shaft IS may be output.

The first brake B1 and the first and second clutches C1 and C2 may be simultaneously operated at a seventh forward speed stage D7.

In a state that the fourth shaft TM4 is connected to the eighth shaft TM8 by operation of the first clutch C1 and the input shaft IS is connected to the fifth shaft TM5 by operation of the second clutch C2, the torque of the input shaft IS may be input to the second shaft TM2 and the fifth shaft TM5. In addition, the seventh shaft TM7 may be operated as the fixed element by operation of the first brake B1. Therefore, the torque of the input shaft IS may be shifted into the seventh forward speed stage, and the seventh forward speed stage may be output through the output shaft OS connected to the eighth shaft TM8.

The first brake B1 and the first and third clutches C1 and C3 may be simultaneously operated at an eighth forward speed stage D8.

In a state that the fourth shaft TM4 is connected to the eighth shaft TM8 by operation of the first clutch C1 and the third shaft TM3 is connected to the fifth shaft TM5 by operation of the third clutch C3, the torque of the input shaft IS may be input to the second shaft TM2. In addition, the seventh shaft TM7 may be operated as the fixed element by operation of the first brake B1. Therefore, the torque of the input shaft IS may be shifted into the eighth forward speed stage, and the eighth forward speed stage may be output through the output shaft OS connected to the eighth shaft TM8.

The first and second brakes B1 and B2 and the first clutch C1 may be simultaneously operated at a reverse speed stage REV.

In a state that the fourth shaft TM4 is connected to the eighth shaft TM8 by operation of the first clutch C1, the torque of the input shaft IS may be input to the second shaft TM2. In addition, the seventh shaft TM7 and the first shaft TM1 may be operated as the fixed elements by operation of the first and second brakes B1 and B2. Therefore, the torque of the input shaft IS may be shifted into the reverse speed stage, and the reverse speed stage may be output as an inverse rotation speed through the output shaft OS connected to the eighth shaft TM8.

The planetary gear trains according to an exemplary embodiment of the present disclosure may achieve at least eight forward speed stages and one reverse speed stage by combining four planetary gear sets PG1, PG2, PG3 and PG4 with three clutches C1, C2 and C3 and two brakes B1 and B2.

In addition, the planetary gear train according to an exemplary embodiment of the present disclosure may achieve suitable speed stages according to a rotation speed of the engine. Particularly, silent driving of the vehicle may be improved by using an operation point positioned at a low rotational speed region of the engine.

In addition, the planetary gear train according to an exemplary embodiment of the present disclosure may maximize driving efficiency of the engine and may improve power delivery performance and fuel consumption.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle comprising:
   an input shaft for receiving torque of an engine;
   an output shaft for outputting torque;
   a first planetary gear set including first, second and third rotation elements;
   a second planetary gear set including fourth, fifth and sixth rotation elements;
   a third planetary gear set including seventh, eighth and ninth rotation elements;
   a fourth planetary gear set including tenth, eleventh and twelfth rotation elements;
   a first shaft connecting the first rotation element to the tenth rotation element;
   a second shaft connected to the second rotation element and directly connected to the input shaft;
   a third shaft connecting the third rotation element to the fourth rotation element;
   a fourth shaft connected to the fifth rotation element;
   a fifth shaft connecting the sixth rotation element to the seventh rotation element and selectively connected to the input shaft or the third shaft;
   a sixth shaft connecting the eighth rotation element to the twelfth rotation element;
   a seventh shaft connected to the ninth rotation element; and
   an eighth shaft connected to the eleventh rotation element, selectively connected to the fourth shaft and directly connected to the output shaft,
   wherein the first shaft and the seventh shaft are selectively connected to a transmission housing,
   wherein each of the first, second, third, and fourth planetary gear sets is a single pinion planetary gear set, and
   wherein the first, second, third and fourth planetary gear sets are disposed in a sequence of the third, second, first and fourth planetary gear sets from an engine side.

2. The planetary gear train of claim 1, wherein the first, second and third rotation elements of the first planetary gear set are a first sun gear, a first planet carrier and a first ring gear,
   the fourth, fifth and sixth rotation elements of the second planetary gear set are a second sun gear, a second planet carrier and a second ring gear,
   the seventh, eighth and ninth rotation elements of the third planetary gear set are a third sun gear, a third planet carrier and a third ring gear, and
   the tenth, eleventh and twelfth rotation elements of the fourth planetary gear set are a fourth sun gear, a fourth planet carrier and a fourth ring gear, respectively.

3. The planetary gear train of claim 2, wherein the fourth sun gear externally engaged with a fourth pinion gear rotatably supported by the fourth planet carrier is divided into two pieces apart from each other which form a space therebetween, and a connecting member penetrating through the fourth pinion gear and connecting both side surfaces of the fourth planet carrier is connected to the eighth shaft through the space and is directly connected to the output shaft.

4. The planetary gear train of claim 1, further comprising:
   a first clutch selectively connecting the fourth shaft to the eighth shaft;
   a second clutch selectively connecting the input shaft to the fifth shaft;
   a third clutch selectively connecting the third shaft to the fifth shaft;
   a first brake selectively connecting the seventh shaft to the transmission housing; and
   a second brake selectively connecting the first shaft to the transmission housing.

5. A planetary gear train of an automatic transmission for a vehicle comprising:
   an input shaft for receiving torque of an engine;
   an output shaft for outputting torque;
   a first planetary gear set including first, second and third rotation elements;
   a second planetary gear set including fourth, fifth and sixth rotation elements;
   a third planetary gear set including seventh, eighth and ninth rotation elements; and
   a fourth planetary gear set including tenth, eleventh and twelfth rotation elements,
   wherein the input shaft is directly connected to the second rotation element,
   the output shaft is directly connected to the eleventh rotation element,
   the first rotation element is directly connected to the tenth rotation element,
   the third rotation element is directly connected to the fourth rotation element,
   the sixth rotation element is directly connected to the seventh rotation element and is selectively connected to the input shaft or the fourth rotation element,
   the eighth rotation element is directly connected to the twelfth rotation element, and
   the eleventh rotation element is selectively connected to the fifth rotation element,
   wherein the ninth rotation element and the tenth rotation element are selectively connected to a transmission housing, respectively,
   wherein each of the first, second, third, and fourth planetary gear sets is a single pinion planetary gear set, and
   wherein the first, second, third and fourth planetary gear sets are disposed in a sequence of the third, second, first and fourth planetary gear sets from an engine side.

6. The planetary gear train of claim 5, wherein the first, second and third rotation elements of the first planetary gear set are a first sun gear, a first planet carrier and a first ring gear,
   the fourth, fifth and sixth rotation elements of the second planetary gear set are a second sun gear, a second planet carrier and a second ring gear,
   the seventh, eighth and ninth rotation elements of the third planetary gear set are a third sun gear, a third planet carrier and a third ring gear, and
   the tenth, eleventh and twelfth rotation elements of the fourth planetary gear set are a fourth sun gear, a fourth planet carrier and a fourth ring gear, respectively.

7. The planetary gear train of claim 6, wherein the fourth sun gear externally engaged with a fourth pinion gear rotatably supported by the fourth planet carrier is divided into two pieces apart from each other which form a space therebetween, and a connecting member penetrating through the fourth pinion gear and connecting both side surfaces of the fourth planet carrier is connected to the eighth shaft through the space and is directly connected to the output shaft.

8. The planetary gear train of claim 5, further comprising:
   a first clutch selectively connecting the fifth rotation element to the eleventh rotation element;

a second clutch selectively connecting the input shaft to the seventh rotation element;
a third clutch selectively connecting the fourth rotation element to the seventh rotation element;
a first brake selectively connecting the ninth rotation element to the transmission housing; and
a second brake selectively connecting the tenth rotation element to the transmission housing.

* * * * *